United States Patent
Ouyoung

(10) Patent No.: US 6,619,567 B1
(45) Date of Patent: Sep. 16, 2003

(54) STRUCTURE OF A FLEXIBLE WATER TAP

(75) Inventor: Scott Ouyoung, Taipei (TW)

(73) Assignee: Globe Union Industrial Corp., Taichung (TW)

(*) Notice: Subject to any disclaimer, the term of this patent is extended or adjusted under 35 U.S.C. 154(b) by 0 days.

(21) Appl. No.: 10/193,920

(22) Filed: Jul. 15, 2002

(51) Int. Cl.[7] .............................................. A62C 31/00
(52) U.S. Cl. ...................... 239/441; 239/436; 239/443; 239/575; 239/588; 137/625.48
(58) Field of Search ..................... 239/25, 436, 441, 239/443–449, 564, 575, 562, 588; 137/625.48, 625.5; 251/319

(56) References Cited

U.S. PATENT DOCUMENTS

| | | | | |
|---|---|---|---|---|
| 3,637,143 A | * | 1/1972 | Shames et al. | 239/283 |
| 3,768,777 A | * | 10/1973 | Hechler, IV | 251/319 |
| 5,823,229 A | * | 10/1998 | Bertrand et al. | 137/614.2 |
| 6,145,757 A | * | 11/2000 | Knapp | 239/443 |
| 6,220,297 B1 | * | 4/2001 | Marty et al. | 137/801 |
| 6,290,147 B1 | * | 9/2001 | Bertrand et al. | 239/444 |
| 6,370,713 B2 | * | 4/2002 | Bosio | 4/677 |

* cited by examiner

Primary Examiner—Gregory Huson
Assistant Examiner—Amanda Flynn
(74) Attorney, Agent, or Firm—Leong C. Lei

(57) ABSTRACT

A structure of flexible water tap with a nozzle having an extension pipe that can be pulled out from the water outgoing pipe to facilitate the rinsing and water supply, wherein the middle of the outgoing water section of the inner nozzle has an axial pipe and a plurality of passages transversally disposed in the middle section of the inner nozzle. Different elements are installed at the two water outgoing positions on the end cover in order to give different ways for the outgoing water. A splitter set is installed by passing through the middle section of the nozzle for producing a transversal displacement such that the entire structure only requires one hand to pull the nozzle from the position of the water outlet of the water tap, changes the flow path as well as the outgoing water condition, and thus attains the effect of convenient rinsing with simple control.

3 Claims, 7 Drawing Sheets

STRUCTURE OF A FLEXIBLE WATER TAP

BACKGROUND OF THE INVENTION

1. Field of the Invention

The present invention relates to an improved structure of a flexible water tap, more particularly to an improved water tap structure having an extension pipe that can be pulled out from the water outgoing pipe to facilitate the rinsing and supplying water.

2. Description of the Related Art

A water tap is one of the necessary tools in our daily life, and the development of the water tap drives people to be fastidious about the application of the rinsing method such as the hand washing sink, kitchen working table, and sinks adopting different tap structure for the rinsing in order to provide application in different situations for consumers. These applications and designs for special use are derivatives of the regular tap, which give a more convenient way of using water for consumers.

As to housewives and cooks, they stay in the kitchen for long time and generally need to rinse and get water. Therefore, the manufacturers have made adjustments to the water tap and tried to give a better way of rinsing and getting water, so that the consumer can rinse the kitchenware or supply water into containers much easier. The rinsed article may get cleaner in-this way, and the way of getting water may become simpler and easier. However, the fixed position and the height of water tap generally require the user to hold the container by hand to fit the position of outgoing water from the tap. Therefore, the position of holding does not comply with the ergonomics or is difficult for the user to get water due to the size of the kitchenware or container and the space available. As to the practical effect of the rinsing or the water supply, it is obviously improper and not effective. Therefore, manufacturers tried to use a shower nozzle and extension pipe for connecting to the traditional water tap and expect to create a better effect and a new model of water tap structure.

In view of the above description of the shortcomings of the prior art, the present inventor herein with many years in the related field performs a series of researches and developments to enhance the traditional water tap structure, and intends to overcome the shortcomings of the prior art such as the improper ergonomic design, poor outgoing water direction, and finally succeeds to invent the improved flexible water tap structure of the present invention.

SUMMARY OF THE INVENTION

The primary objective of the present invention is to provide an easy-to-use and ergonomic water tap structure.

The secondary objective of the present invention is to provide an improved water tap structure with split nozzle design such that the mode of water flow can be switched by using only one hand to press the soft cover. To make it easier to understand the objective of the invention, its structure, innovative features, and its performance, we use a preferred embodiment together with the attached drawings for the detailed description of the invention.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENT

Figure 1:
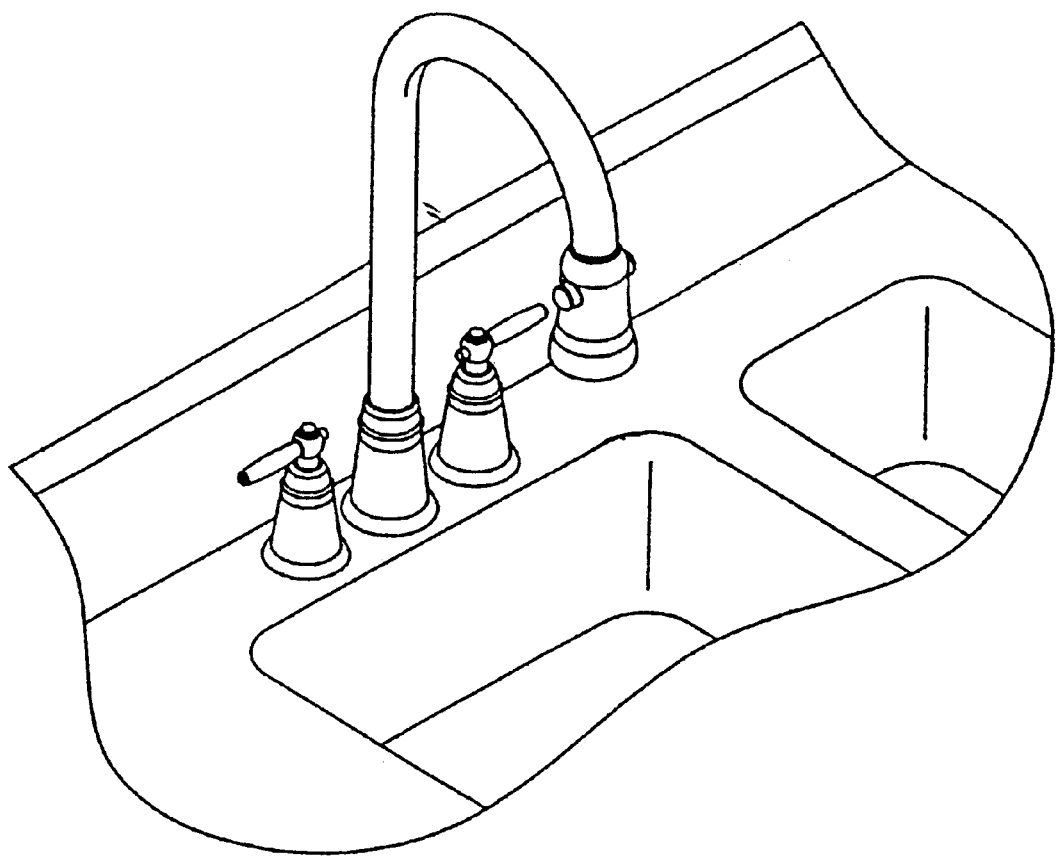
FIG. 1 is a perspective diagram of the water tap of the present invention.
Figure 2:
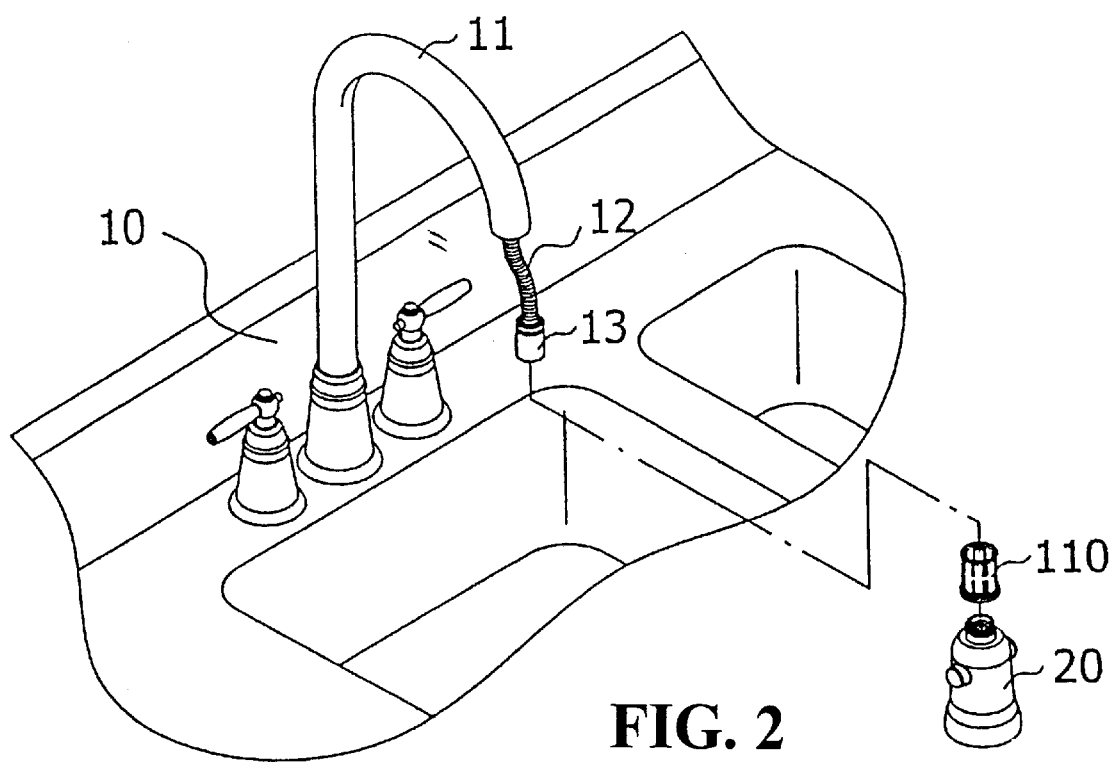
FIG. 2 is a diagram of the dissembled parts of the water tap of the present invention.
Figure 4:
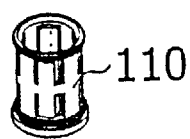
FIG. 4 is an enlarged diagram of the connector of the present invention.
Figure 3:
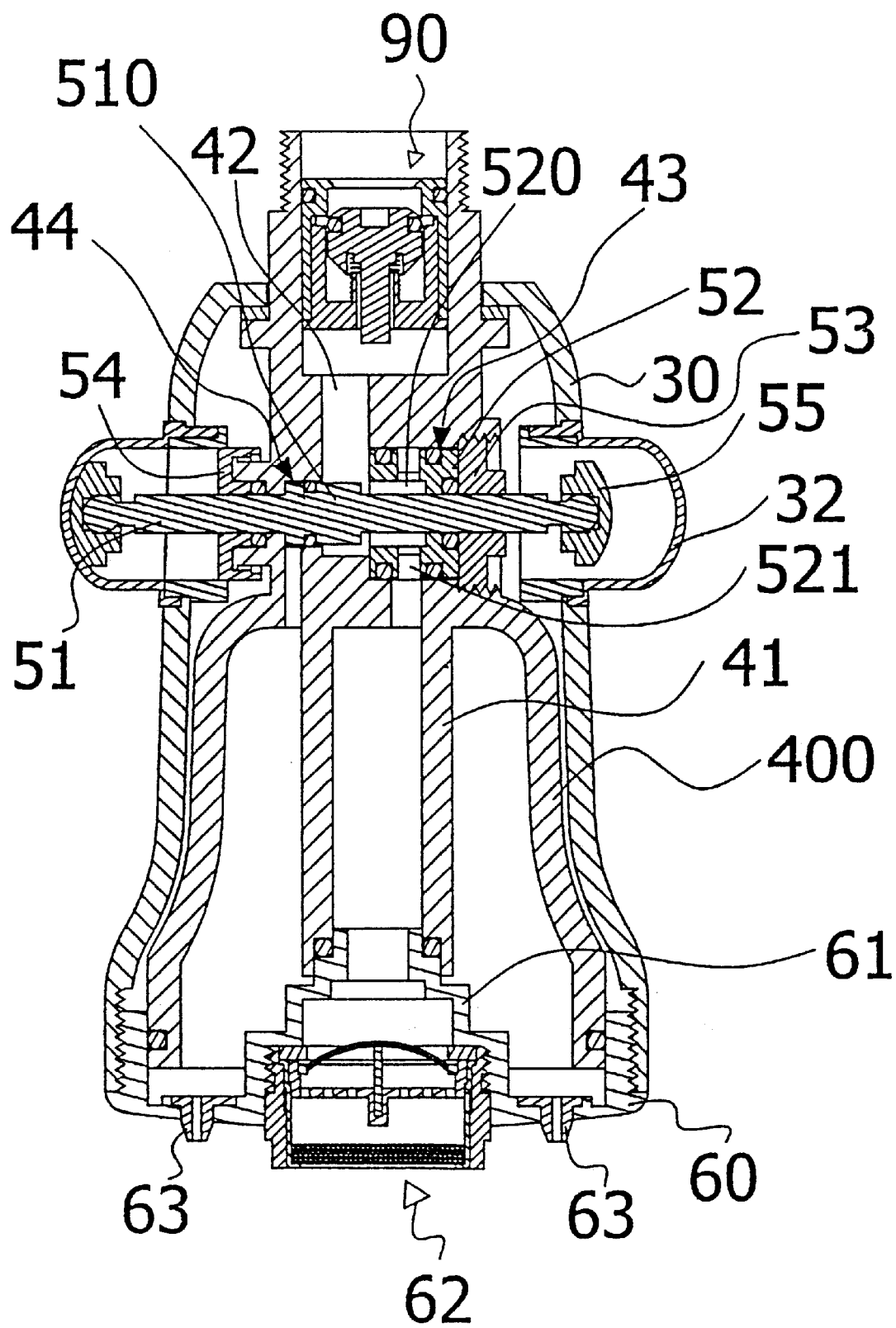
FIG. 3 is a cross-sectional diagram of the major part of the water tap according to the present invention.
Figures 5, 6:
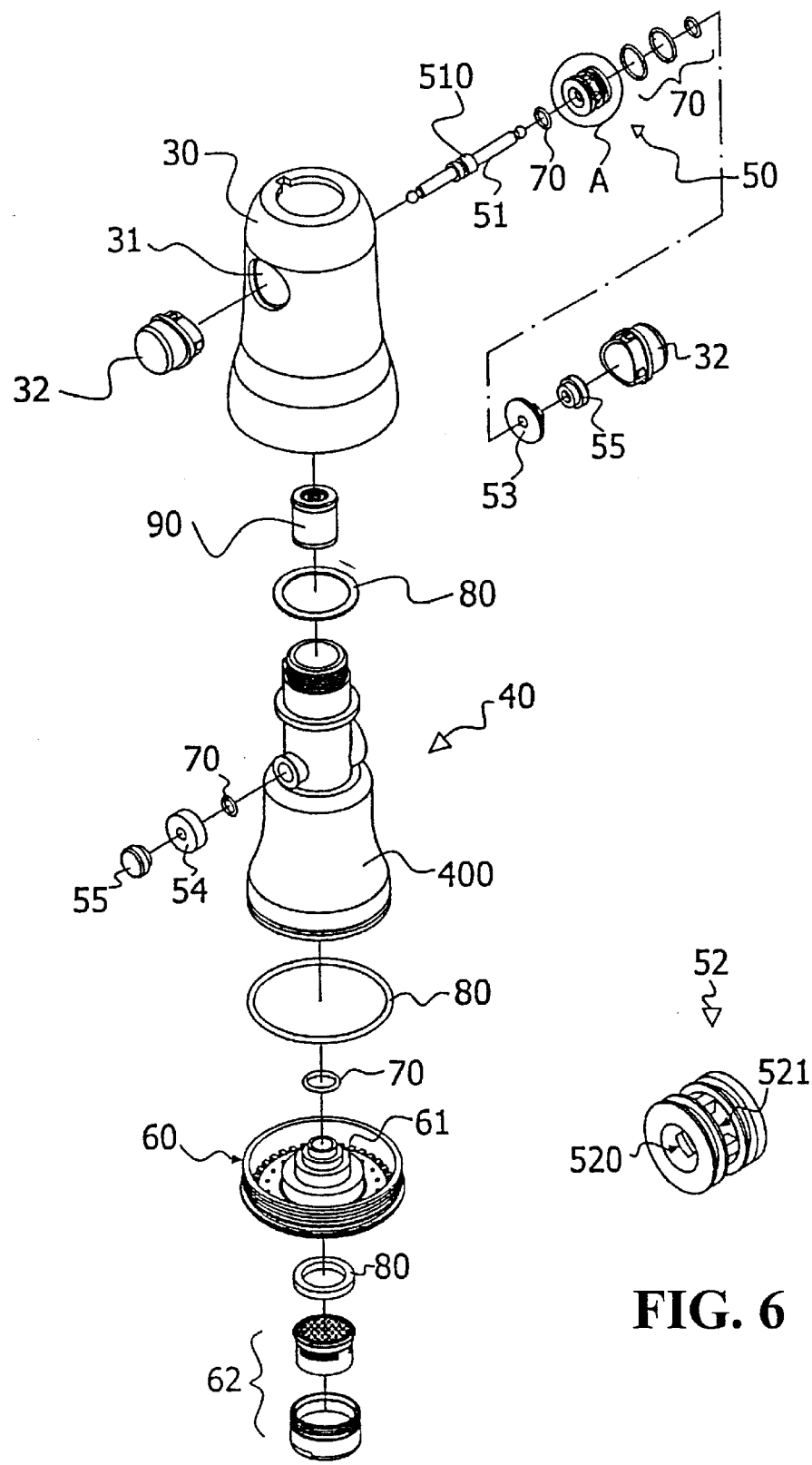
FIG. 5 is an explosive diagram of the nozzle of the water tap according to the present invention.
FIG. 6 is an enlarged diagram of the washer of the water tap according to the present invention.
Figure 7:
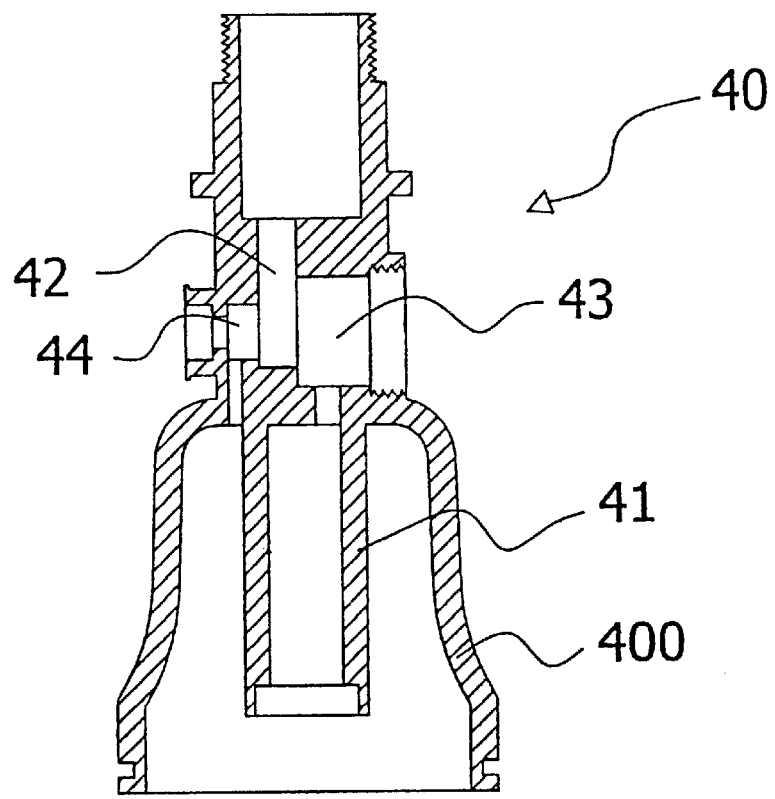
FIG. 7 is a cross-sectional diagram of the inner nozzle of the present invention.

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Referring to FIGS. 1 to 7, the main structure of the water tap 10 according to the present invention comprises a casing 30, an inner nozzle 40, and an end cover 60; wherein an extension pipe 12 is disposed inside and passes through an outgoing water pipe 11 of the water tap 10, and the extension pipe 12 is a pipe that can be bent freely, and after being coupled to the interior of the water tap and the splitter valve (not shown in the figures), the extension pipe 12 can be extended outward, and the length of the extension pipe 12 can provide a certain distance for pulling from the water outgoing pipe 11 to produce a distance for supplying water, and its outwardly extended end has a connector 13 in a slightly conical shape coupled to the main nozzle 20, and the direction of the outgoing water from the main nozzle 20 is the same as the axial direction of the outgoing water of the extension pipe 12. An inner nozzle is disposed on the inner side of a hood-shaped casing 30 of the main nozzle 20, and the water outgoing end at its bottom is fixed to a side casing 30 and the inner nozzle 40 at the water outgoing of an end cover 60 by screws; wherein the inner nozzle 40 is a two-sectional stairway-like body, and an end of the outgoing water is a water outgoing section 400, and an axial pipe 41 is disposed at the center of the interior of the water outgoing section 400, and a passage is transversally disposed in the middle section of the inner nozzle 40, and such passage forms a plurality of chambers with holes of different diameters, and connected to the other side of the passage and an upwardly opened water incoming path 42. A main chamber 43 and a secondary chamber 44 are adjacent to the inner nozzle 40 and the water incoming path 42 respectively, and the main chamber 43 is connected to the axial pipe 41, and the secondary chamber 44 is connected to the inner space formed by the water outgoing section 400 and the axial pipe 41, such that the central part of the inner nozzle 40 is divided into two flows; the end cover 60 fixes the nozzle 40 into the casing 30, and its body is substantially an upwardly opened concave cover; a circular ring is upwardly disposed on the outer ring, and a male screw thread is disposed on the periphery of the circular ring for fixing into the female screw thread in the bottom side of the casing 30; a connecting section 61 is disposed at the center of the connecting surface; the connection section 61 is stairway-shaped conical member, and a water outgoing passage is formed at the center of the conical body, and the most protruded stairway-shape conical member from the top of the connecting section 61 is coupled to an opening at the bottom where an axial pipe 41 passes through, and an O-shaped ring is placed between the space of the contact areas of the two to attain the sealing effect. A filter set 62 is disposed in the outgoing passage in the connecting section 61, and a plurality of nozzles 63 are disposed around the circular surface of the end cover 60, such that the outgoing passage in the connecting section 61 and the space between the upper section of the nozzle 63 and the external edge of the splitting section forms water outgoing positions with different flowing paths. Further, a splitter set 50 is passed through the chamber at the middle section of the inner nozzle 40, and the splitter set 50 further comprises a push rod 51, a bolt sleeve 52, a bolt cover 53, a seal cover 54, two end covers 55, and a plurality of O-shaped rings, wherein the push rod 51 transversally passes through the chamber at the middle section of the inner nozzle 40, and both ends have spherical members pressing into the two end covers. When the inner nozzle 40 passes into the casing 30, both ends of the push rod 51 and the end covers 55 will pass through as well and be exposed outside the two through holes 31 on the casing 30, and two soft cover 32 are set onto the through holes 31 to form a closed system and constitutes the external appearance of the press button. A protruded ring section 510 with a larger diameter at the middle section of the push rod 51, and a bolt sleeve 52 is disposed on the side of the protruded ring section 510, and such bolt sleeve 52 is set in the main chamber 43 of the inner nozzle 40; two grooves are disposed on the outer periphery to accommodate two O-shaped rings 70 for the insulation and sealing; on the surface of the other side of the protruded ring section 510 corresponsive to a bolt sleeve 52, a bolt cover 53 is fixed onto the female screw thread inside the main chamber 43 to press the bolt sleeve 52 into a position, and an accommodating groove 520 leading to the central opening is disposed inside the bolt sleeve 52, and its diameter is large enough to just accommodate the protruded ring section 510 of the push rod 51; a plurality of penetrating holes 521 extending to the diameter are disposed at the middle section of the outer circumference of the bolt sleeve 52 so that the accommodating groove 520 can be led to the axial pipe 41. Further the seal cover 54 and an O-shaped ring 70 are compressed to form a seal at the opening of another inner nozzle 40 corresponsive to the bolt cover 53.

Figure 8:
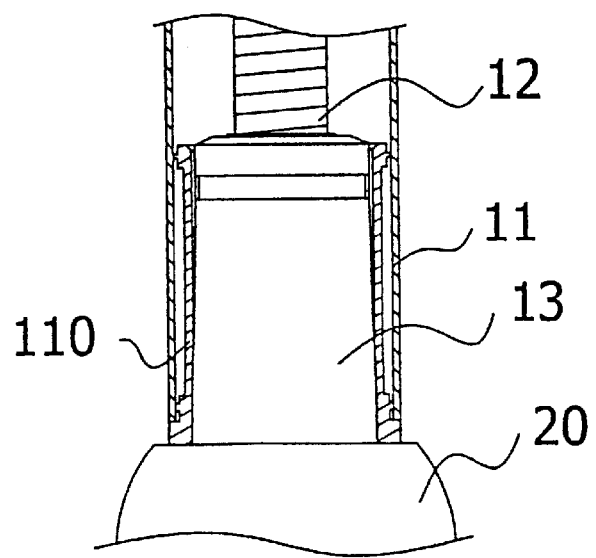
FIG. 8 is a cross-sectional diagram showing the coupling of the nozzle and water outgoing pipe according to the present invention.
Figure 9:
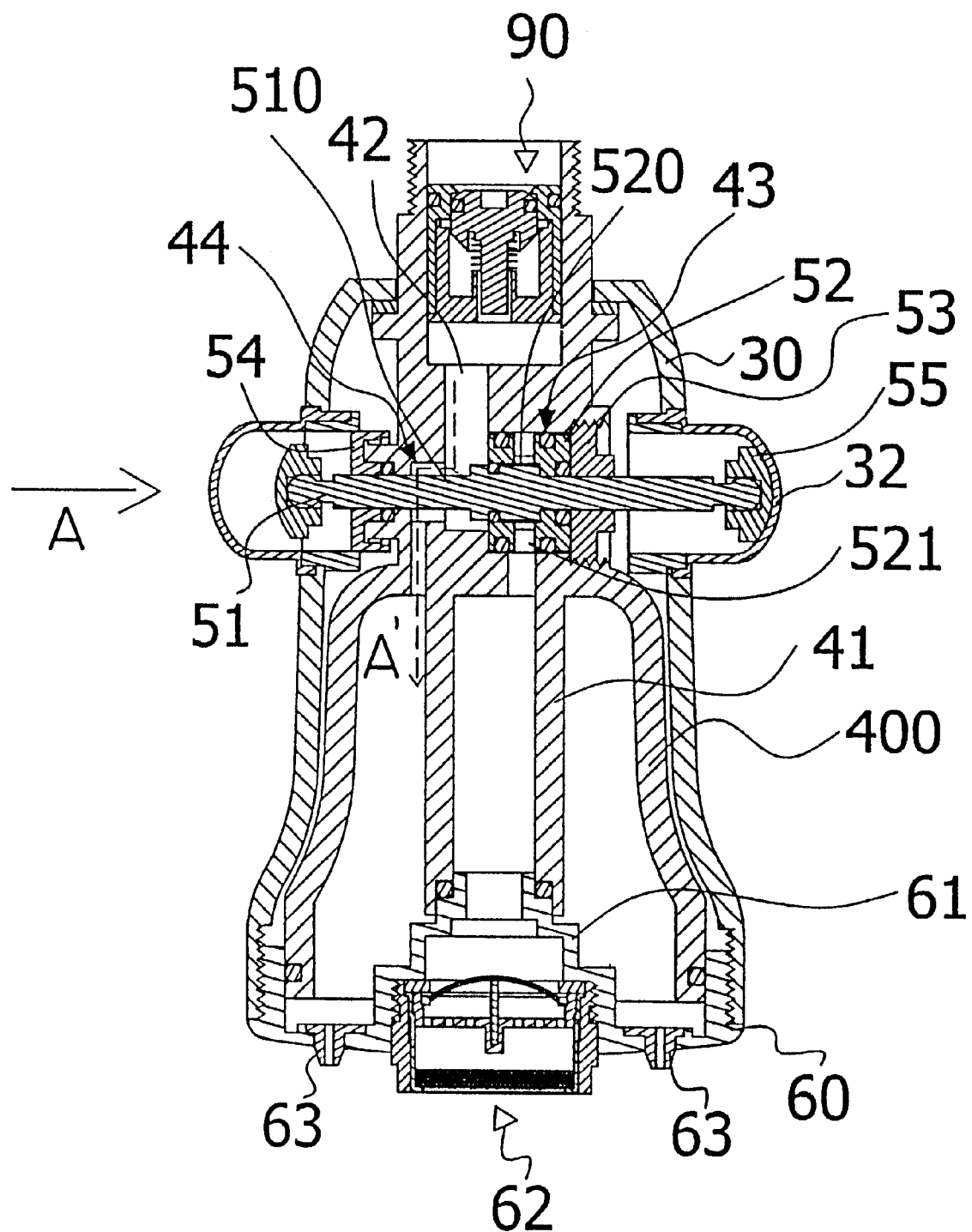
FIG. 9 is a cross-sectional diagram of the nozzle splitter showing its movement.
Figure 10:
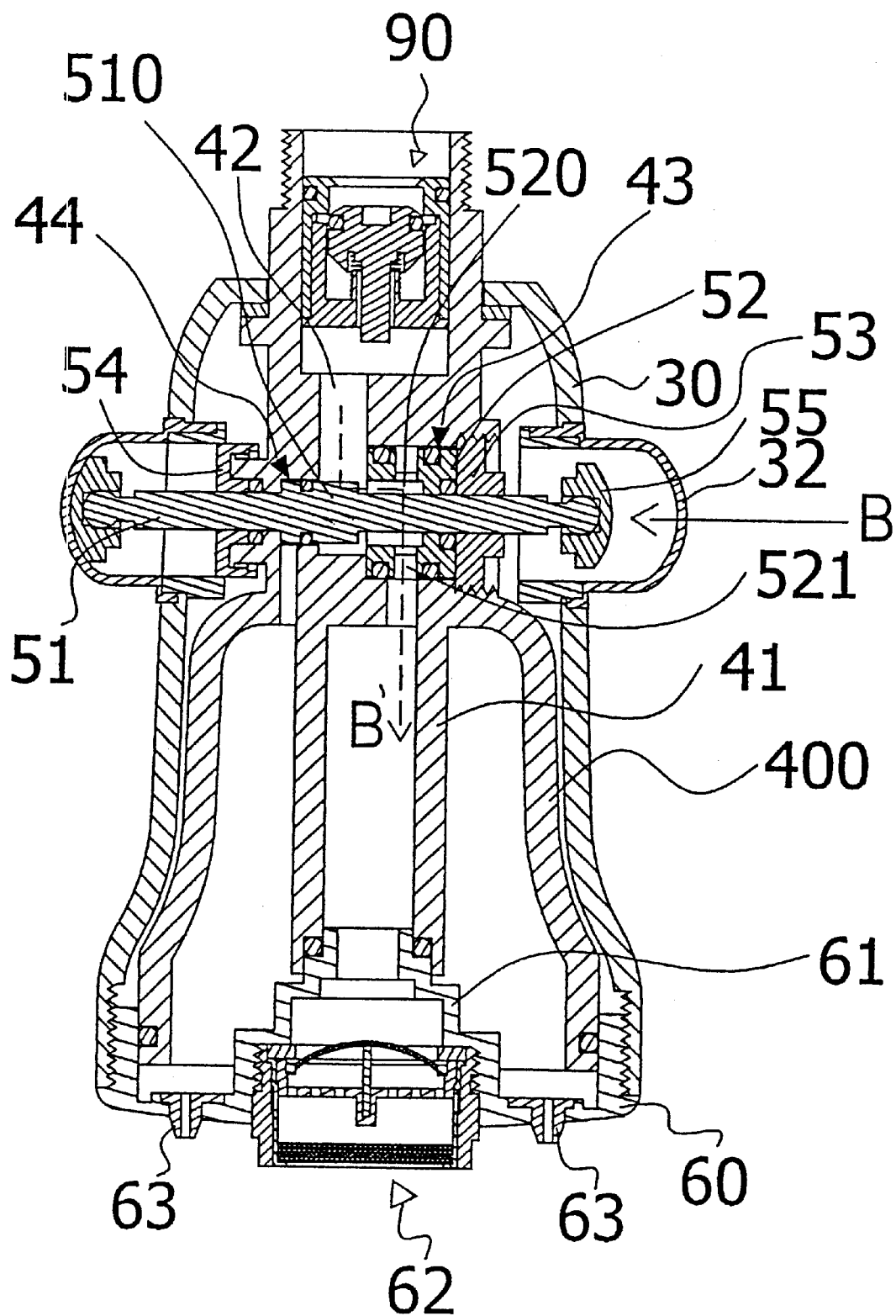
FIG. 10 is another cross-sectional diagram of the nozzle splitter showing its movement.

Please see FIG. 8. The coupling of the main nozzle 20 and the outgoing pipe 11 of the water tap 10 according to the present invention mainly has a connector 110 at the end opening of the outgoing pipe 11, and such connector 110 is hollow and slightly elastic; since its inner diameter is slightly larger than the front section of the connector 13 at the front end of the extending pipe 12, therefore after the extension pipe 12 is accommodated, the connector 13 and the connector 110 of the outgoing pipe 11 can provide a fight coupling force to couple the nozzle 20 to the front end of the outgoing pipe 11 in order to attain the functions of coupling and detaching movement for the rinsing operations. Please see FIGS. 9 and 10. The design of the aforementioned structure according to the present invention allows the user to use one hand to pull the nozzle with the extension pipe for rinsing, and return the nozzle back to position after releasing the nozzle. When the user pulls the extension pipe with the nozzle for rinsing, the user just needs to press the soft sleeve 32 (in the direction A as shown in the figure) on the casing 30 of the nozzle 20 in order to embed the protruded ring section 510 of the push rod 51 into the accommodating groove 520 of the bolt sleeve 52 to block the passage to the interior of the axial pipe 41. Then the water flow will flow through the side chamber 44 (along the path A') into the outgoing section 400 in the inner nozzle 40, and the water flows out from the position of the nozzle 63. When the push rod 51 is pressed in the reverse direction (Direction B as shown in the figure), the protruded ring section 510 will embed into the side chamber 44 to block the passage in the direction towards the nozzle, and the water will flow through the accommodating groove 520 of the bolt sleeve 52, and the through hole 521 into the axial pipe 41 of the inner nozzle 40 (in the direction B'), and then passes through the filter set 62 before flow out from the nozzle. Therefore, the entire structure completes the change of water path; a water saver 90 can be added at the outlet at the top end of the inner nozzle 40 to cope with the water flow from the tap in different countries, which can save water by the feature of adjusting the quantity of water supply.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A flexible water tap structure having an extension pipe passing through and disposed inside a water outgoing pipe of the water tap, and an end of the extension pipe being pivotally coupled to a water flowing path inside the water tap at a water outgoing end, the other end of the extension pipe passing through the water outgoing pipe, and a main nozzle being coupled to a slightly conical connector, wherein the main nozzle comprises a case, an inner nozzle, and an end cover, the extension pipe being capable of bending freely and being disposed in the water outgoing pipe of the water tap, the extension pipe having a length for providing a distance for pulling from the water outgoing pipe to produce a distance for supplying water, a connector being disposed at an outwardly extended end of the extension pipe and being coupled to the main nozzle, the inner nozzle being disposed within the casing, and the water outgoing end being coupled to the end cover, the inner nozzle being a two-sectional stairway-shaped body having an axial pipe at a center of an interior of a water outgoing end, the axial pipe having an outgoing section between the axial pipe and a periphery of the inner nozzle, a passage being transversally disposed at a middle section of the inner nozzle, the passage having a plurality of different sized holes forming a plurality of chambers, and having a lead to an opening of incoming water flow at a side of the passage, a main chamber and a secondary chamber being disposed adjacent to the inner nozzle and an incoming path respectively, the main chamber and the axial pipe being connected, the secondary chamber, the outgoing section, and the axial pipe forming an interconnecting interior space, the end cover fixing the inner nozzle to an upwardly concave cover body in the casing, a circular ring being upwardly disposed at an outer ring, and a male screw thread being disposed on an outer periphery of the circular ring corresponding to a female screw thread on a bottom edge of the casing and fixed to a connecting section of a stairway-shape conical body protruded from a center of the end cover, an outgoing passage being formed at a center of the stairway-shape conical body of the connecting section, a topmost protruded position of the stairway-shaped conical body being coupled tightly and passing into an opening at a bottom of the axial pipe, an O-shaped ring being placed between space of contact area between the conical body and the axial pipe to seal the space, the connecting section having a filter set in the outgoing passage, and a plurality of nozzles being set around the circular surface of the end cover such that the outgoing passage in the interior of the connecting section and the space between the water splitting section of the outer ring and the axial pipe forming a water outgoing position separately, a splitter set passing through the position of the accommodating chamber at the middle section of the inner nozzle, and the splitter set further comprising a push rod, a bolt sleeve, a bolt cover, a seal cover, two end covers, and a plurality of O-shaped rings, wherein the push rod transversally passing through the accommodating chamber at the middle section of the inner nozzle, and both of its ends having a spherical body to press into both cover ends; when the inner nozzle passing through the casing, both ends of the push rod passing through the two through holes exposed on the casing, and two soft cover being disposed on the two through holes to seal and form the external look of the press button, and a protruded ring section with larger outer diameter being disposed in the middle section of the push rod; a bolt sleeve passing through the side of the protruded ring section, and the bolt sleeve being sleeved into the main chamber of the inner nozzle, and its outer periphery having two grooves with two O-shaped rings for insulating and sealing; on the surface of the other side of the protruded ring section corresponsive to a bolt cover fixed into the interior of the main chamber at the corresponsive position of the female screw thread inside the main chamber to press the bolt sleeve into a position, and an accommodating groove leading to the central opening being disposed inside the bolt sleeve, and its diameter being large enough to just accommodate the protruded ring section of the push rod; a plurality of penetrating holes extending to the diameter disposed at the middle section of the outer circumference of the bolt sleeve so that the accommodating groove can be led to the axial pipe; the seal cover and an O-shaped ring being compressed to form a seal at the opening of another inner nozzle corresponsive to the bolt cover; the coupling of the main nozzle and the outgoing pipe of the water tap according to the present invention mainly having a connector at the end opening of the outgoing pipe, and such connector being a hollow and slightly elastic connector; since its inner diameter being slightly larger than the front section of the connector at the front end of the extending pipe, therefore after the extension pipe being accommodated, the connector and the connector of the outgoing pipe providing a tight coupling force to couple the nozzle to the front end of the outgoing pipe and thus attains the coupling and detaching movement for the rinsing operations.

2. The flexible water tap structure as claimed in claim 1, wherein said connector at its outer edge having a protruded fixing member, and a groove being disposed at a fixing passage on the inner edge of the opening at the front end of the outgoing pipe, for fixing the direction of use when the nozzle of the main body being passed.

3. The flexible water tap structure as claimed in claim 1, wherein said inner nozzle at its top having a water saver to control the water flow according to the quantity of the water supply.

* * * * *